United States Patent
Farris-Gilbert et al.

(10) Patent No.: US 8,360,384 B2
(45) Date of Patent: Jan. 29, 2013

(54) COLLAPSIBLE SUPPORT DEVICE AND COMPOSITE MATERIAL FOR MAKING THE SAME

(75) Inventors: Cezanne-Simon Farris-Gilbert, Long Beach, CA (US); Arjun Adamson-Mohan, Pasadena, CA (US)

(73) Assignee: XFX Creation Inc., Ontario, CA (US)

( * ) Notice: Subject to any disclaimer, the term of this patent is extended or adjusted under 35 U.S.C. 154(b) by 275 days.

(21) Appl. No.: 12/769,531

(22) Filed: Apr. 28, 2010

(65) Prior Publication Data

US 2010/0276560 A1 Nov. 4, 2010

Related U.S. Application Data

(60) Provisional application No. 61/173,849, filed on Apr. 29, 2009, provisional application No. 61/318,674, filed on Mar. 29, 2010.

(51) Int. Cl.
A47B 97/04 (2006.01)

(52) U.S. Cl. ..... 248/459; 248/460; 248/174; 206/45.24; 108/51.3

(58) Field of Classification Search ............... 248/441.1, 248/444, 447, 449, 454, 459, 460, 165, 166, 248/174; 206/45.24, 45.27, 45.29; 108/51.3
See application file for complete search history.

(56) References Cited

U.S. PATENT DOCUMENTS

| | | | |
|---|---|---|---|
| 502,601 A | 8/1893 | Anderson et al. | |
| 524,926 A | 8/1894 | Anderson et al. | |
| 525,356 A | 9/1894 | Nelson | |
| 527,108 A | 10/1894 | Cooper | |
| 681,976 A | 9/1901 | Rathvon | |
| 971,634 A | 10/1910 | Pilsbry | |
| 1,096,327 A | 5/1914 | Thorniley | |
| 1,275,195 A | 8/1918 | Apple | |
| 1,409,525 A | 3/1922 | Cox | |
| 1,822,261 A | 9/1931 | Apple | |
| 1,913,790 A | 6/1933 | Buntschu et al. | |
| 1,983,439 A | 12/1934 | De Vore | |
| 2,454,526 A | 11/1948 | Savastano | |
| 2,677,211 A | 5/1954 | Luketa | |
| 2,720,251 A | 10/1955 | Luketa | |
| 2,726,835 A * | 12/1955 | Hummel | 248/459 |
| 3,167,036 A | 1/1965 | Brossard | |
| 3,381,928 A | 5/1968 | White | |
| 3,410,516 A * | 11/1968 | Criswell | 248/459 |
| 3,920,276 A | 11/1975 | Sparrow | 297/142 |

(Continued)

FOREIGN PATENT DOCUMENTS

| | | |
|---|---|---|
| EP | 0 837 386 | 4/1998 |
| JP | 06-232567 | 8/1994 |

(Continued)

OTHER PUBLICATIONS

All Office magazine, Fall 1998, pp. 1,3,17,19-25.

(Continued)

*Primary Examiner* — Tan Le

(74) *Attorney, Agent, or Firm* — Seed IP Law Group PLLC

(57) ABSTRACT

A collapsible support device for a mobile device, incorporating a composite member that can be selectively transitioned between an intermediate state, a tilted state and collapsed state. The composite member includes at least one rigid layer coupled to a malleable layer, and a first plurality of hinge elements that facilitate transition between the above states, the hinge elements including the malleable layer and substantially excluding the rigid layer.

12 Claims, 15 Drawing Sheets

U.S. PATENT DOCUMENTS

| | | | |
|---|---|---|---|
| 4,085,961 A | 4/1978 | Brown | 296/37.6 |
| D253,981 S | 1/1980 | Fritz et al. | D6/184 |
| 4,199,125 A | 4/1980 | Simon | 248/441 A |
| 4,307,672 A | 12/1981 | Shikimi | 108/139 |
| 4,313,112 A | 1/1982 | Foster | 340/700 |
| 4,437,638 A | 3/1984 | Scheibenpflug | 248/282 |
| 4,500,134 A | 2/1985 | Kaneko et al. | 297/170 |
| 4,515,086 A | 5/1985 | Kwiecinski et al. | 108/96 |
| 4,522,364 A | 6/1985 | Charney et al. | 248/460 |
| 4,562,987 A | 1/1986 | Leeds et al. | 248/278 |
| 4,567,835 A | 2/1986 | Reese et al. | 108/7 |
| 4,571,456 A | 2/1986 | Paulsen et al. | 179/2 C |
| 4,600,255 A | 7/1986 | Dubarko | 312/333 |
| 4,619,429 A | 10/1986 | Mazza | 248/447.2 |
| 4,624,433 A | 11/1986 | Henneberg | 248/346 |
| 4,635,893 A | 1/1987 | Nelson | 248/558 |
| 4,657,214 A | 4/1987 | Foster | 248/176 |
| 4,685,647 A | 8/1987 | Calhoun | 248/444.1 |
| 4,706,575 A | 11/1987 | Hamlin | 108/102 |
| 4,708,312 A | 11/1987 | Rohr | 248/280.1 |
| 4,717,112 A | 1/1988 | Pirkle | 248/639 |
| 4,742,478 A | 5/1988 | Nigro, Jr. et al. | 364/708 |
| 4,747,572 A | 5/1988 | Weber | 248/442.2 |
| 4,790,506 A | 12/1988 | Malinowski et al. | 248/441.1 |
| 4,830,328 A | 5/1989 | Takach, Jr. et al. | 248/639 |
| 4,832,303 A | 5/1989 | Myeeo | 248/444.1 |
| 4,863,124 A | 9/1989 | Ball et al. | 108/28 |
| 4,863,140 A | 9/1989 | Schriner | 248/639 |
| 4,893,775 A | 1/1990 | Long | 248/442.2 |
| 4,913,502 A | 4/1990 | Russell | 312/233 |
| 4,934,853 A | 6/1990 | King, III | 400/718 |
| 4,974,808 A | 12/1990 | Ball | 248/917 |
| D321,293 S | 11/1991 | Kucsak | D6/419 |
| 5,106,047 A | 4/1992 | Baer | 248/459 |
| 5,122,941 A | 6/1992 | Gross et al. | 362/276 |
| D328,314 S | 7/1992 | MacEwan | D19/91 |
| 5,149,047 A | 9/1992 | Tucker | 248/459 |
| 5,260,884 A | 11/1993 | Stern | 364/708.1 |
| D348,081 S | 6/1994 | Cady | D19/91 |
| 5,323,291 A | 6/1994 | Boyle et al. | 361/683 |
| 5,377,598 A | 1/1995 | Kirchner et al. | 108/97 |
| 5,383,643 A | 1/1995 | Koch | 248/447 |
| D358,271 S | 5/1995 | Leveen et al. | D6/419 |
| 5,436,792 A | 7/1995 | Leman et al. | 361/686 |
| 5,452,531 A | 9/1995 | Graville et al. | 38/104 |
| 5,503,361 A | 4/1996 | Kan-O et al. | 248/688 |
| D372,371 S | 8/1996 | Grove, Jr. | D6/419 |
| 5,552,960 A | 9/1996 | Nelson et al. | 361/687 |
| D377,276 S | 1/1997 | Hirsch et al. | D6/419 |
| 5,633,782 A | 5/1997 | Goodman et al. | 361/683 |
| D383,909 S | 9/1997 | Salas | D6/310 |
| 5,704,212 A | 1/1998 | Erler et al. | 62/3.2 |
| 5,722,628 A * | 3/1998 | Menaged | 248/441.1 |
| 5,769,369 A | 6/1998 | Meinel | 248/176.1 |
| 5,771,814 A | 6/1998 | Clausen | 108/93 |
| 5,788,575 A | 8/1998 | Fluster | 248/463 |
| 5,818,360 A | 10/1998 | Chu et al. | 341/22 |
| 5,822,185 A | 10/1998 | Cavello | 361/686 |
| 5,832,840 A | 11/1998 | Woof | 108/6 |
| 5,871,094 A | 2/1999 | Leibowitz | 206/320 |
| 5,899,421 A | 5/1999 | Silverman | 248/175 |
| D413,872 S | 9/1999 | Jessen | D14/114 |
| 5,971,168 A * | 10/1999 | Proulx | 211/85.4 |
| 6,116,562 A | 9/2000 | Griffin | 248/444.1 |
| 6,186,343 B1 | 2/2001 | Brown | 211/40 |
| 6,256,193 B1 | 7/2001 | Janik et al. | 361/683 |
| 6,266,241 B1 | 7/2001 | Van Brocklin et al. | 361/687 |
| 6,305,652 B1 | 10/2001 | Borke et al. | 248/174 |
| D451,306 S | 12/2001 | Dow | D6/474 |
| 6,352,233 B1 | 3/2002 | Barberich | 248/676 |
| D455,755 S | 4/2002 | Levine et al. | D14/447 |
| D459,397 S | 6/2002 | Zeller et al. | D19/88 |
| 6,490,154 B2 | 12/2002 | Thompson | 361/686 |
| 6,491,278 B1 | 12/2002 | Thomsen | 248/460 |
| 6,543,949 B1 | 4/2003 | Ritchey et al. | 400/691 |
| 6,545,864 B2 | 4/2003 | Davis, IV | 361/683 |
| D494,977 S | 8/2004 | Persson | D14/447 |
| 6,913,238 B2 | 7/2005 | Bakker et al. | 248/460 |
| D534,730 S | 1/2007 | Hardy | D6/312 |
| 7,334,768 B1 * | 2/2008 | Lum | 248/444 |
| 2002/0162935 A1 | 11/2002 | Hardy | 248/460 |
| 2006/0285283 A1 | 12/2006 | Simonian et al. | 361/679 |
| 2010/0276381 A1 | 11/2010 | Howlett | 211/59.2 |
| 2010/0301187 A1 | 12/2010 | Peet | 248/447 |

FOREIGN PATENT DOCUMENTS

| | | |
|---|---|---|
| NL | 1003469 | 7/1996 |
| WO | 00/17736 | 3/2000 |

OTHER PUBLICATIONS

BK Products, Disk-Bay CD & Disk Storage System, http://www.be-ken.com/index.htm, download date Apr. 20, 2000.

Information brochure of Bakker & Elkhuizen Ergonomie.

"AViiQ Aluminum Laptop Stand—World's Thinnest Laptop Stand," retrieved from http//techiser.com/aviiq-aluminum-laptop-stand-130868.html., downloaded Feb. 4, 2011, 5 pages.

\* cited by examiner

US 8,360,384 B2

COLLAPSIBLE SUPPORT DEVICE AND COMPOSITE MATERIAL FOR MAKING THE SAME

BACKGROUND

1. Technical Field

The present disclosure is related to support devices and composite materials, and more particularly, to a collapsible support device for use with computers, books, displays or the like, and to a composite material for making the same.

2. Description of the Related Art

Individuals have increasingly mobile lifestyles with respect to both work and social activities. As a result, many work and social activities are conducted on the go in cars, airplanes, airports, or any other location. This trend has resulted in a rise in mobile devices such as laptop computers, electronic books, portable DVD players with displays, portable televisions, video projectors, etc. Even when individuals are not traveling, they often use mobile devices to be able to move around within an office or home and/or simultaneously tend to other tasks while using the device, or to take the device with them when they are done using the device to continue their work or other activity on the mobile device in a different location.

However, since mobile devices are designed to be compact, they are typically not ergonomic. For example, laptop computers generally rest flat on a surface, resulting in an unergonomic positioning of a user's arms and wrists when typing, which can lead to pain and in some cases long term ailments such as tendonitis. Furthermore, portable DVD players have displays or screens that are difficult to be optimally positioned or pivoted with respect to the base of the player in some situations, such as when positioned on an airplane food tray. For instance, pivoting the display to a desired position may be obstructed by the seat in front of the user. In addition, the user may want to read electronic or traditional books while using his or her hands for another task. These items too typically rest flat on a surface, which can result in an awkward angle from the reader's perspective, making reading difficult.

Past solutions include support devices that alter the positioning of mobile devices on a surface; however, these solutions are not mobile themselves, they are bulky, heavy and awkward for storage and/or use, prone to being damaged when transported, and/or not sufficiently compactable to eliminate the need for storing and transporting them separately from the mobile device.

For example, some solutions include integrating a raising structure on devices such as computer laptop computers. However, these devices are prone to damage and can only be used with the particular device with which they are integrated. Other solutions include removable stands that are customized for a particular device, such as laptop computers and video projectors. However, these devices are also limited in use with only the particular device for which they are customized. In addition, these devices are typically not easily mobile or storable after they are assembled. Other attempts at more universal stands are still bulky and have awkward shapes, which inhibit storage and easy transport of these stands.

Furthermore, support devices that incorporate some form of compacting feature do not facilitate substantially reducing the size of the device so that it can be transported in a single compact casing with the mobile device. These support devices are therefore typically space-consuming even in the allegedly compact form. Additionally, the same features that make these devices transform from the supporting configuration to a smaller configuration, are susceptible to damage during the transformation process or while being transported.

DETAILED DESCRIPTION

Figure 1:
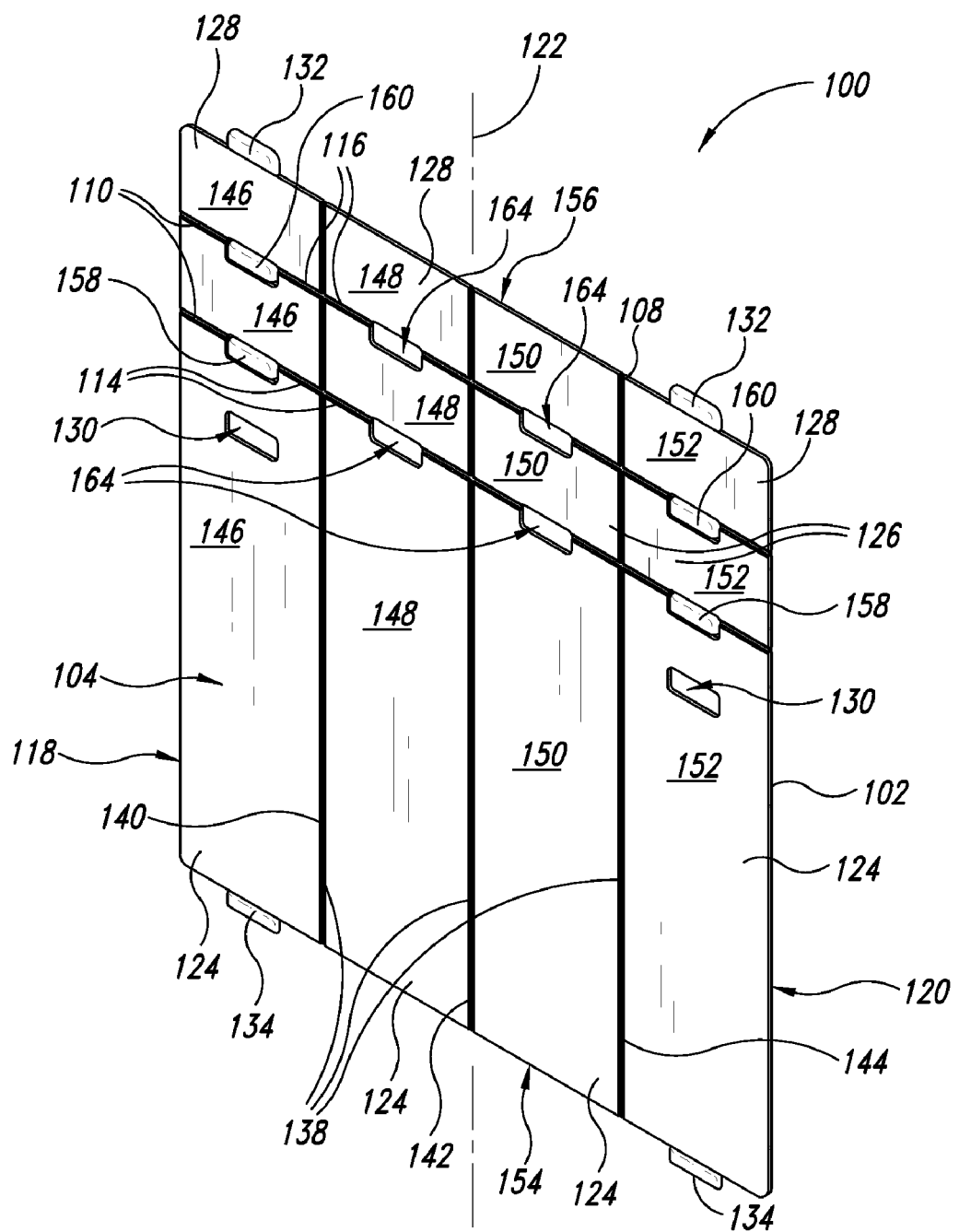
FIG. 1 is an isometric view of a collapsible support device in a first flat or intermediate state according to one embodiment.
Figure 2:
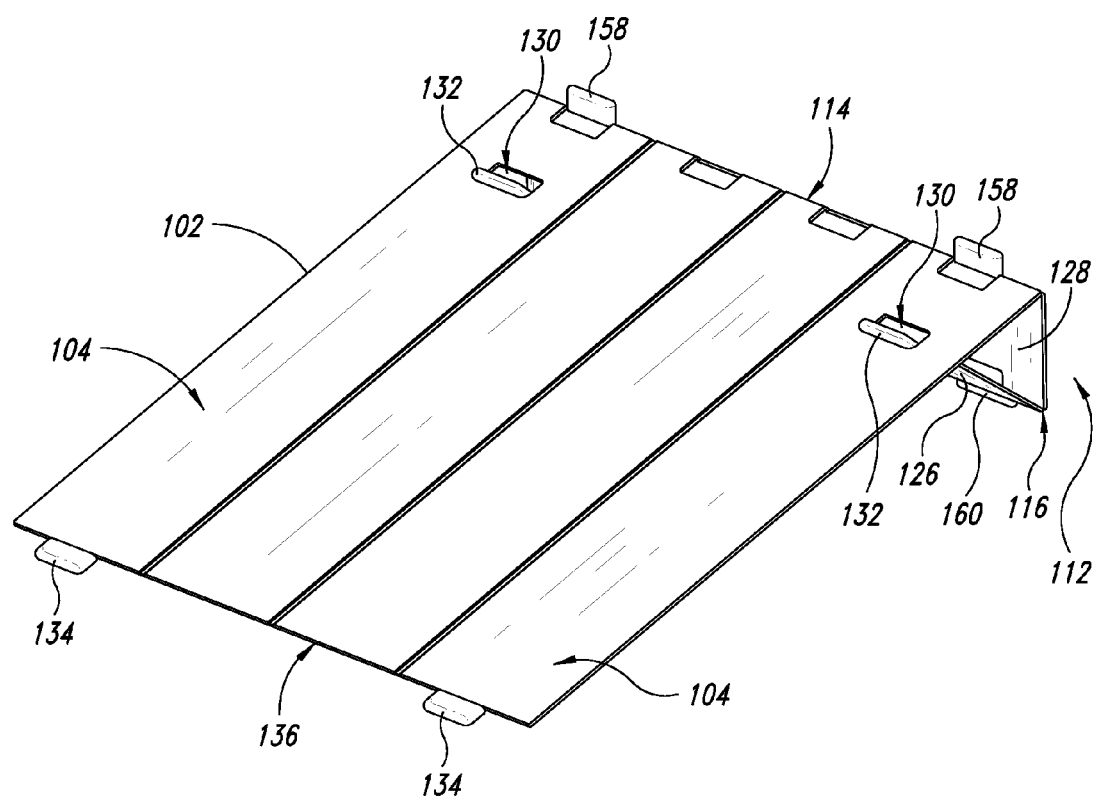
FIG. 2 is an isometric view of a collapsible support device in a second tilted or support state according to one embodiment.

FIG. 1 illustrates one embodiment of an integrated collapsible support device 100 according to one embodiment. The support device 100 includes a composite member 102 which a user can selectively and expediently transition between multiple states and/or configurations. For example, FIG. 1 shows the support device 100 in an intermediate state, while FIGS. 2 and 3 show the support device in a tilted state and a collapsed state, respectively, according to one embodiment. The support device 100 is configured to support a mobile device such as a lap top computer, a DVD player, video projector, or the like, on, adjacent or proximate a support surface 104 of the support device 100.

The support device 100 further facilitates orienting the mobile device differently when the device 100 is in different states, or when it is oriented differently in the same state, to bring about a desired ergonomic positioning or orientation of the mobile device. Additionally, the support device 100 facilitates easy storage and transport of the device 100, especially when in the intermediate and collapsed states. In these states, particularly in the collapsed state, the device 100 can easily fit in the same bag, or other storage or transport accessory, in which the mobile device is transported, precluding the need to separately store or carry the device 100.

According to one aspect, as illustrated in FIG. 1, the composite member 102 includes at least one rigid layer 106 and at least one malleable layer 108. The rigid and malleable layers 106, 108 are more clearly shown in the close-up view of FIG. 4. In the illustrated embodiment of FIG. 4, the composite member 102 includes two rigid layers 106 that sandwich the malleable layer 108 along at least a portion of the composite member 102. For example, in the illustrated embodiment of FIGS. 1-3, the malleable layer 108 forms a core that is positioned between the two rigid layers 106 in at least a majority of the composite member 102.

Referring to FIG. 1, the support device 100 includes a first plurality of hinge elements 110 that facilitate forming a raised region 112 (FIG. 2). As shown in FIG. 2, the raised region 112 orients the base of the mobile device at a particular angle to provide a more ergonomic positioning and/or orientation of the mobile device. For example, the raised region 112 provides a more comfortable and ergonomically correct typing position when a laptop computer is placed on the device 100. Furthermore, the raised region 112 provides a more diverse range of rotation of a mobile device screen or display, such as the display of a laptop computer or a portable DVD player.

For example, in one embodiment, the composite member 102 and/or the plurality of hinge elements 110 (FIG. 1) can include a first hinge element 114 and a second hinge element 116. In one embodiment, the first and second hinge elements 114, 116 extend between lateral ends 118, 120 of the composite member 102 and/or the device 100. The terms "lateral" and "longitudinal," and related terms such as "laterally" or "longitudinally," are used herein with respect to an axis 122, illustrated in FIG. 1, which can extend from a proximal end of the device 100 to a distal end thereof, with respect to the user, when a mobile device is placed on the supporting surface 104. These terms are used for clarity of description and convenience, and are not intended to limit the orientation, shape, size, and/or configuration of the device 100 or composite member 102, in any manner.

In the illustrated embodiment of FIG. 1, the first and second hinge elements 114, 116 are shown to be substantially linear and parallel; however, other configurations such as arcuate and non-parallel are contemplated to be with the scope of the present disclosure.

In one aspect, the first hinge element 114 is positioned between a first panel or plurality of panels 124 (collectively referred to as first panel 124 for clarity of description) and a second panel or a plurality of panels 126 (collectively referred to as second panel 126 for clarity of description). The first and second panels 124, 126 are configured to be selectively pivoted with respect to each other about the first hinge element 114. To facilitate pivoting the first and second panels 124, 126, the composite member 102 includes the malleable layer and substantially excludes the rigid layer in the region of the first hinge element 114.

The second hinge element 116 is positioned between the second panel 126 and a third panel or a plurality of panels 128 (collectively referred to as third panel 128 for clarity of description). The second and third panels 126, 128 are configured to be selectively pivoted with respect to each other about the second hinge element 116. To facilitate pivoting the second and third panels 126, 128, the composite member 102 includes the malleable layer 108 and substantially excludes the rigid layer 106 in the region of the second hinge element 116.

In one aspect, the user can selectively pivot the second panel 126 about the first hinge element 114 with respect to the first panel 124, and selectively pivot the third panel 128 about the second hinge element 116 with respect to the second panel 126, to position a portion of the third panel 128 adjacent a portion of the first panel 124. The first panel 124 can include at least one coupling feature 130 and the third panel can include at least one coupling feature 132. In the illustrated embodiment of FIG. 1 the first and third panels 124, 128 each include two of the respective coupling features 130, 132.

The coupling feature 132 of the third panel 128 is configured to be removably engaged to the coupling feature 130 of the first panel 124. The coupling feature 132 of the third panel 128 can be positioned, located and/or formed toward the portion of the third panel 128 that positions adjacent the first panel 124 when the second and third panels 126, 128 are pivoted as described above.

As shown in FIG. 2, when the second and third panels 126, 128 are pivoted as described above, the third panel 128 can be removably coupled to the first panel via coupling features 130, 132, to form the raised region 112 and transition the support device to the tilted state illustrated in FIG. 2. For example, in one embodiment, the coupling features 130 of the first panel 124 can include an opening, aperture, recess, groove, slit, any combination thereof, or other suitable coupling feature, and the coupling features 132 of the third panel 128 can include a protrusion, protuberance, tab, tongue, any combination thereof, or other suitable coupling feature. Without any intention to limit the scope of the coupling features 130, 132, the coupling feature 130 of the first panel 124 will be referred to as opening 130 and the coupling feature 132 of the third panel 128 will be referred to as tab 132, for clarity of description and convenience.

Figure 5A:
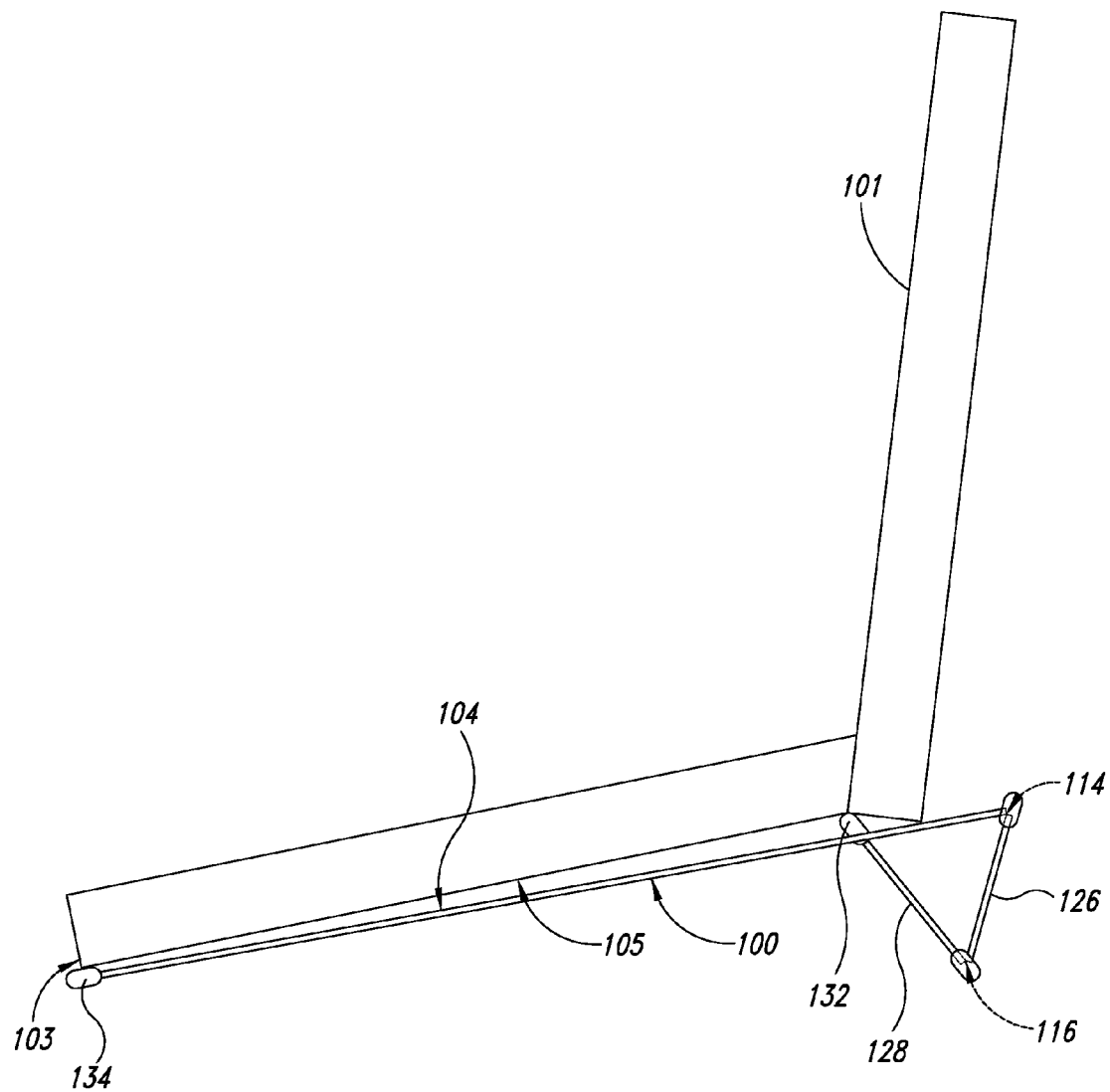
FIG. 5A is a side view of a collapsible support device in the second tilted state according to one embodiment in a first orientation with a mobile device positioned thereon.

As illustrated in FIG. 5A, when the support device 100 is in the tilted state, a mobile device 101, such as a laptop computer, can be positioned on the device 100, for example adjacent or proximate the supporting surface 104. In some embodiments, such as that illustrated in FIGS. 2 and 5A, the tab 132 can protrude through the opening 130 (FIG. 2), and the mobile device 101 can rest on a portion of the tab 132. The tab 132 contacts or engages a surface of the mobile device 101, substantially preventing the mobile device 101 from slipping.

In one aspect, a first protuberance 134 can be formed or coupled to an end 136 (FIG. 2) of the first panel 124, opposed to the first hinge element 114. For example, the first protuberance 134 can be located such that it is positioned adjacent the proximal region 103 of the mobile device 101 when the mobile device 101 is placed on the support device 100. The first protuberance 134 can further facilitate securely supporting the mobile device 101 and preventing it from slipping.

Furthermore, the first protuberance 134 and the protruded tab 132 space the lower surface 105 of the mobile device 101 from the support surface 104 to allow air circulation about the mobile device 101 and prevent overheating of the mobile device 101 and/or components thereof. More than one protuberance 134 can be incorporated toward the end 136 of the first panel 124. The protuberance 134 and/or the tab 132 can include a non-slip material, such as rubber, plastic and/or foam, or any other suitable material.

In some embodiments, the composite member 102 can include additional hinge elements and additional panels that pivot to form an orienting region such as the raised region 112. Furthermore, the first panel 124 can include a plurality of coupling features or openings 130 arranged in a series to facilitate adjusting the height of the raised region 112. In some embodiments, the second and third panels 126, 128 can alternatively pivot about the first and second hinge elements 114, 116, for example, in opposite respective directions, to reduce the size of the support device 100 and facilitate storage and/or transport of the device 100, for example, in a laptop computer bag.

Figure 5B:
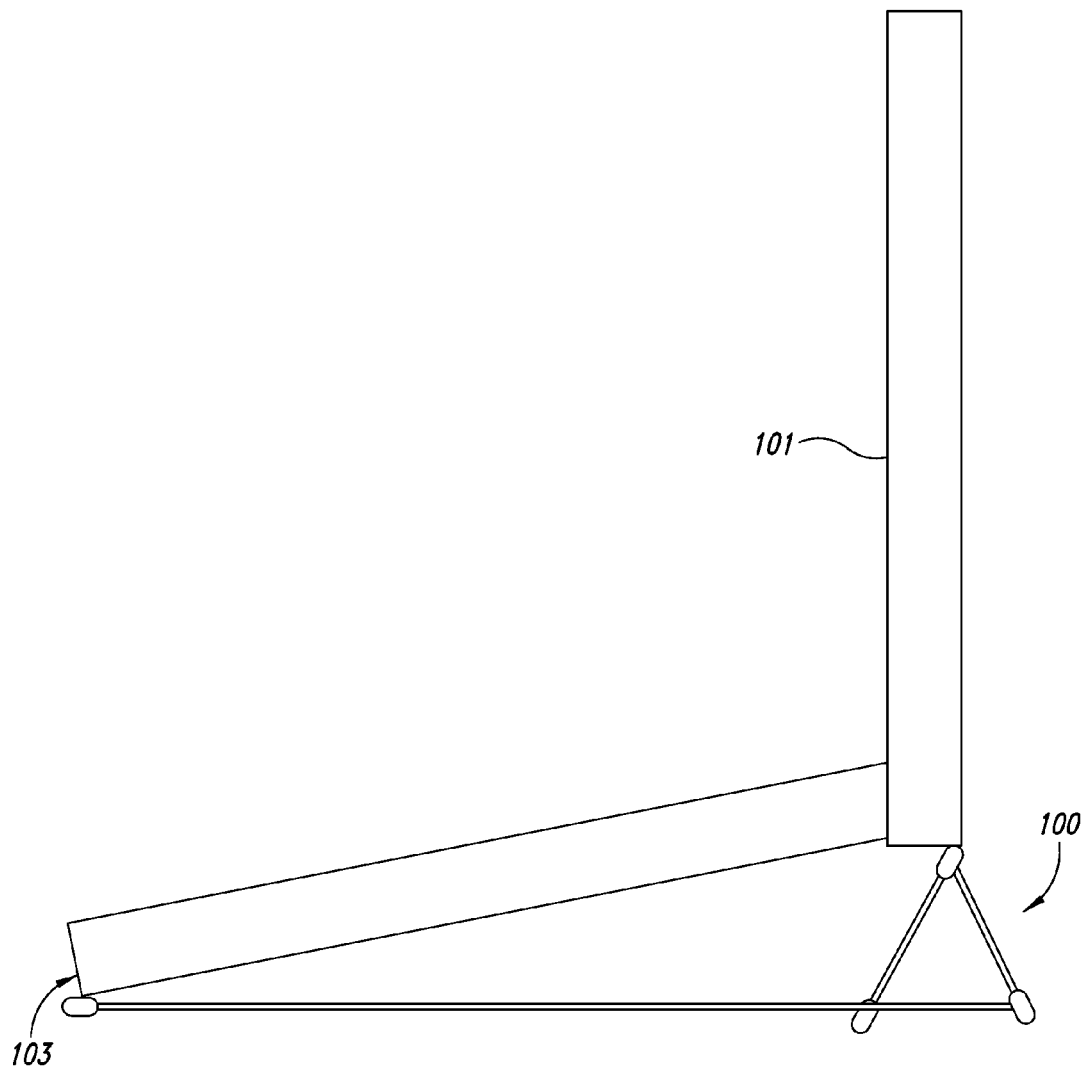
FIG. 5B is a side view of a collapsible support device in the second tilted state according to one embodiment in a second orientation with a mobile device positioned thereon.

Furthermore, as illustrated in FIG. 5B, the support device 100 can be oriented differently in the same state, to adjust the tilt angle of the mobile device 101.

In some embodiments, the support device 100 can include additional features that facilitate collapsing and minimizing of the size and/or shape of the support device 100, to further facilitate storage and/or transport.

Figure 3A:
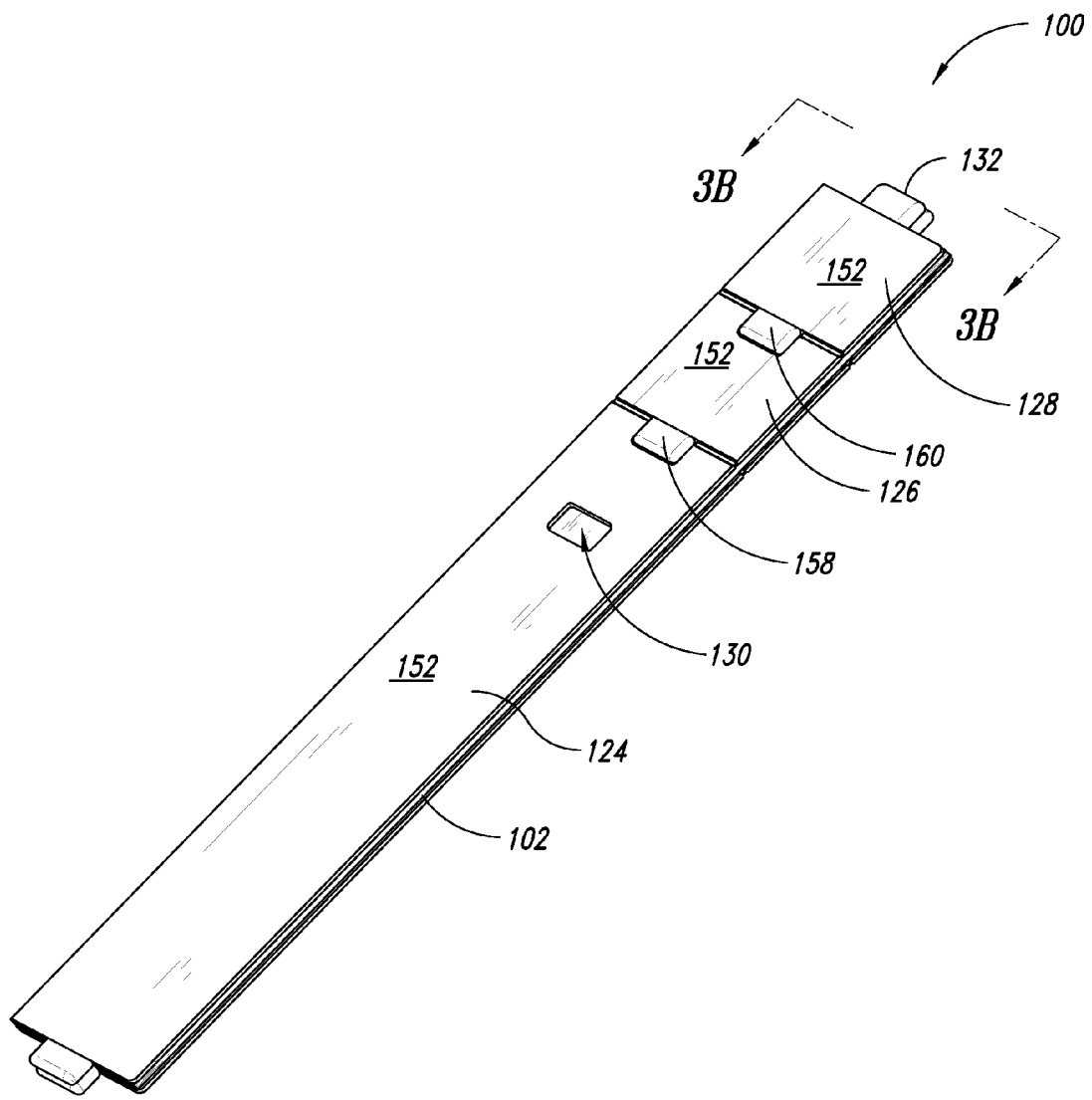
FIG. 3A is a plan view of a collapsible support device in a third collapsed state according to one embodiment.
Figure 4:
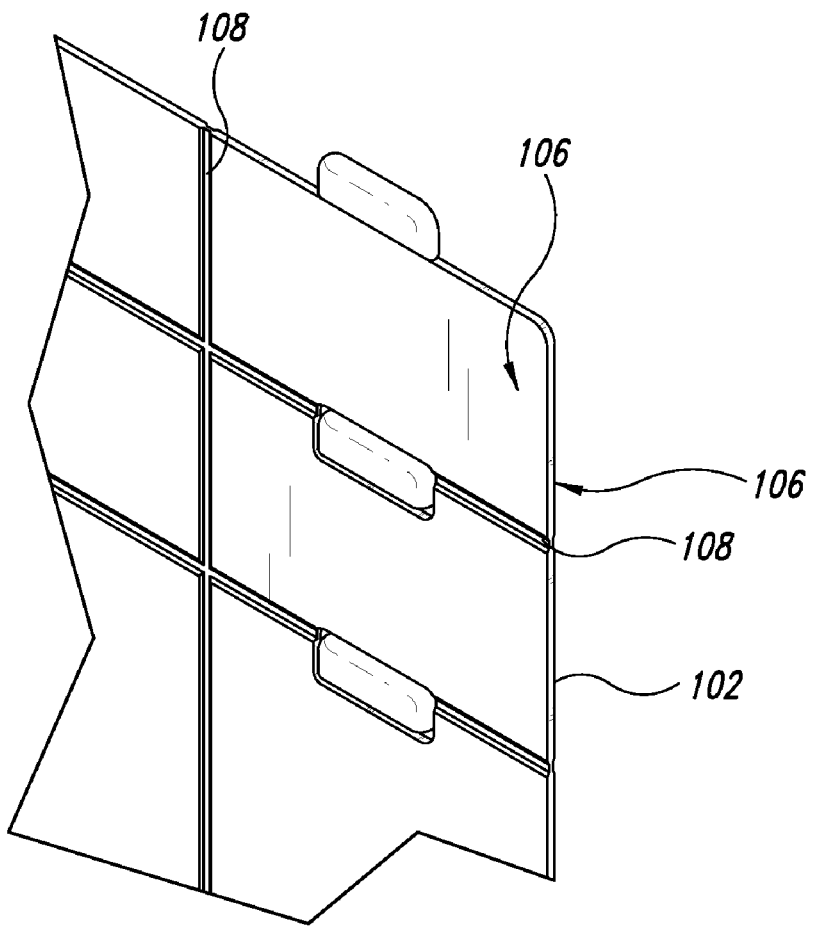
FIG. 4 is an isometric view of a portion of a collapsible support device according to one embodiment.

For example, as illustrated in FIG. 1, the composite member 102 can include a second plurality of hinge elements 138 that facilitate collapsing the support device 100 into a compact form, as illustrated in FIG. 3A. In one embodiment the second plurality of hinge elements 138 can include three folding hinge elements 140, 142, 144, respectively extending between opposing longitudinal ends 152, 154 of the support device 100 and/or composite member 102. The folding hinge elements 140, 142, 144 can include the malleable layer 108 and substantially exclude the rigid layers 106, and segregate the composite member 102 into a plurality of panels, for example, four panels 146, 148, 150, 152.

In some embodiments, the second plurality of hinge elements 138 can intersect the first plurality of hinge elements 110. Therefore, in some embodiments, the panels 146, 148, 150, 152, which are respectively divided or spaced from adjacent panels by the second plurality of hinge elements 138, can each include a plurality of sections or panels separated by the first plurality of hinge elements 110, as shown in FIG. 1.

Furthermore, some or all of the first and second plurality of hinge elements 110, 138 can be configured to facilitate or limit a range of rotating or pivoting the panels 124, 126, 128, 146, 148, 150, 152. For example, the first plurality of hinge elements 110 can have a width such that when the corresponding panels on opposing sides of the respective hinge elements 110 are pivoted with respect to each other, the respective rigid layers of the panels contact and prevent further rotation beyond a desired angle. The second plurality of hinge elements 138 can be wider to allow full range or substantially 360 degrees rotation of the panels for collapsing the support device 100.

The four panels 146, 148, 150, 152 can extend between the longitudinal ends 154, 156 of the composite member 102 and/or support device 100. Each of these panels 146, 148, 150, 152 includes at least the rigid layer 106. Accordingly, as illustrated in FIG. 2, the panels 146, 148, 150, 152 can be folded alternatively, or in opposite directions about the folding hinge elements 140, 142, 144, to collapse the support device and transition it to the collapsed state shown in FIG. 3A, for storage and/or transport.

Figure 3B:
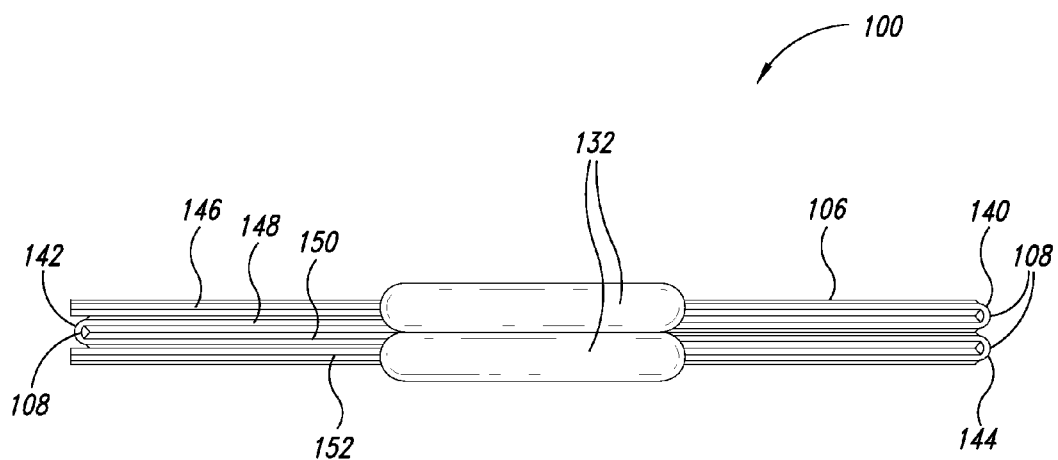
FIG. 3B is an end view of the collapsible support device of FIG. 3A, viewed along section 3B-3B.

FIG. 3B illustrates an end view of the device 100 in the collapsed state, according to one embodiment. FIG. 3B shows the panels 146, 148, 150, 152 folded about hinge elements 140, 142, 144, to collapse the device 100 into a compact size. As stated above, the hinge elements 140, 142, 144 include the malleable layer 108 and substantially exclude the rigid layer or layers 106. In some embodiments, the hinge elements are formed by removing or machining down the rigid layers 106 at the respective hinge locations or regions.

In some embodiments, as illustrated in FIG. 2, some of the protuberances or tabs, for example those that are positioned between terminal ends of the composite member 102, such as protuberances 158, 160, are partially connected to the composite member 102, for example toward one side thereof. In such embodiments, when the adjacent panels are pivoted, these protuberances erect to form feet or raised portions for providing enhanced support on the primary surface on which the collapsible support device is set or for under the mobile device that it is supporting.

Furthermore, some embodiments may include features that facilitate use of the support device 100 as a stand or support for a mobile device when it is in states other than the tilted state shown in FIG. 2. For example, second and/or third protuberances or set of protuberances can be formed on or coupled to the support surface 104 and spaced from the first protuberance or set of protuberances 134. For example, the illustrated embodiments of FIGS. 1 and 6 include second and third sets of two protuberances 158, 160 that are positioned toward the longitudinal end 156 opposed to the end 154 toward which the first set of the protuberances 134 are positioned.

Figure 6:
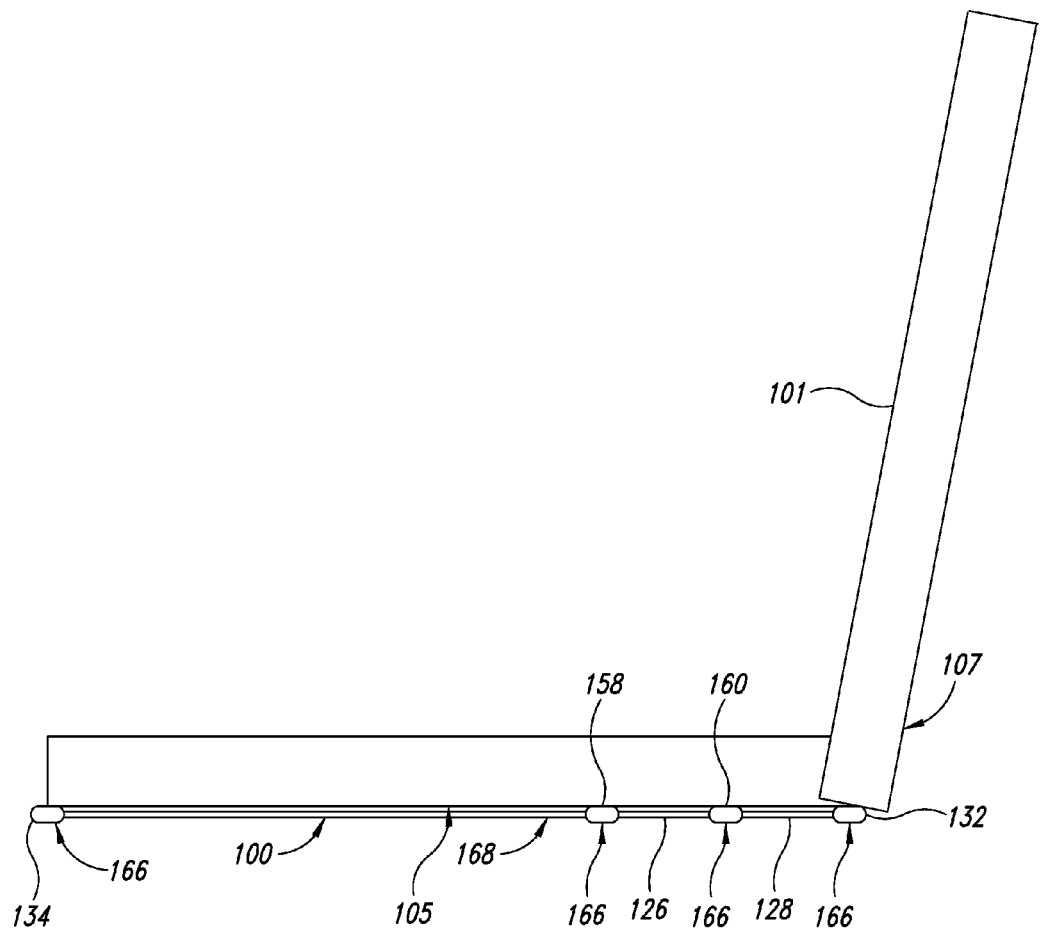
FIG. 6 is a side view of a collapsible support device in the first state according to one embodiment with a mobile device positioned thereon.
Figure 7:
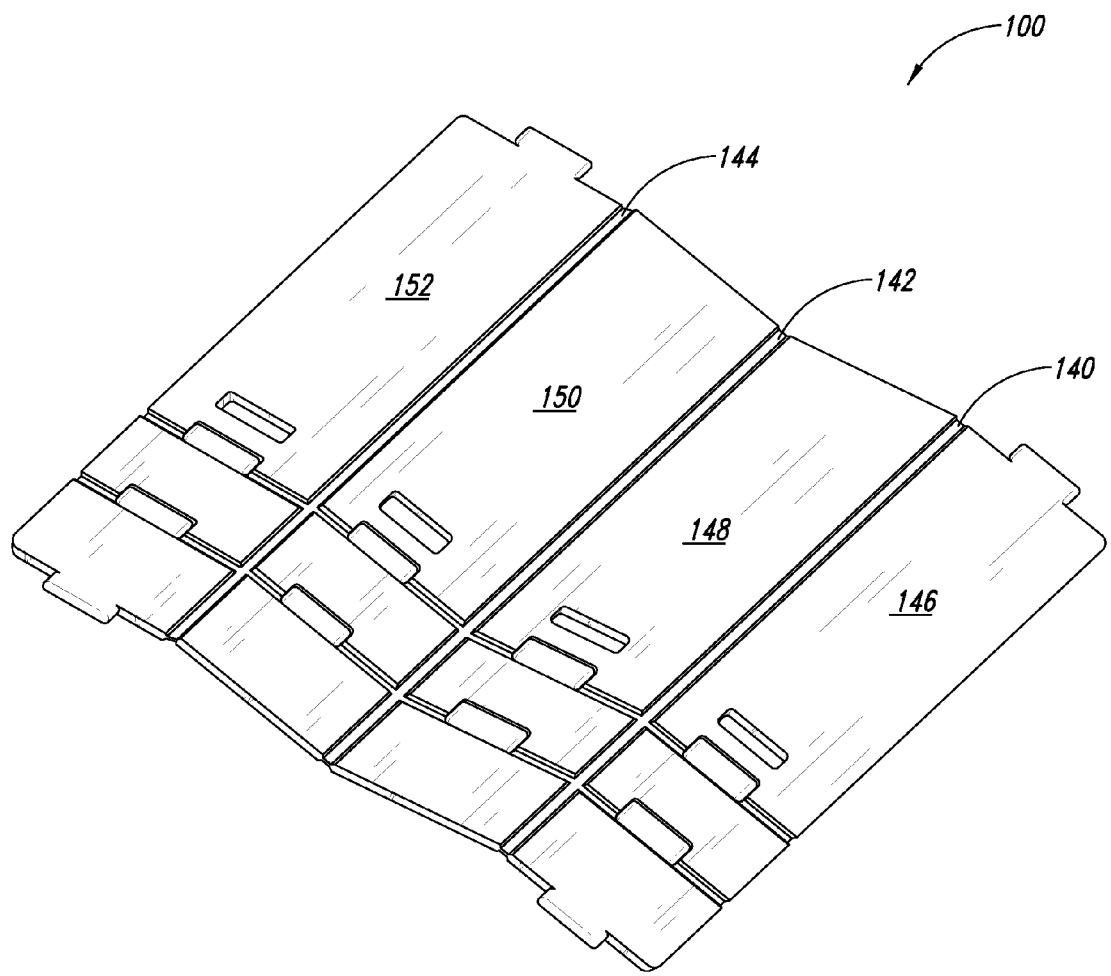
FIG. 7 is an isometric view of a collapsible support device during transition between a first intermediate or flat state, to a third collapsed state, according to one embodiment.

As shown in FIG. 6, the protuberances 134, 158, 160 space the lower surface 105 of the mobile device 101 from the composite member 102, facilitating air circulation to enhance performance durability of the components of the mobile device 101 by preventing overheating thereof.

In one aspect, when the support device 100 is in the intermediate state illustrated in FIGS. 1 and 6, the tabs 132 formed on or coupled to the third panel 128 can also form a protuberance which can be positioned toward a distal end 107 of the mobile device 101 with respect to the user. The second and third protuberances 158, 160 and tabs 132 provide flexibility to support mobile devices of varying sizes. For example, the distal end 162 can be positioned proximate the second protuberance 158 for smaller mobile device and proximate the third protuberance 160 or tab 132 for larger mobile devices.

To further facilitate air circulation, the composite member 102 may include openings 164 as shown in the illustrated embodiment of FIG. 1. In some embodiments, the openings 164, or at least some of them, can be formed to at least partially coincide with any one or more of the first and second plurality of hinge elements 110, 138, facilitating easier pivoting of the corresponding panels 124, 126, 128, 146, 148, 150, 152.

Additionally, the openings 164 reduce the weight of the already light support device 100. These openings 164 can be sized, shaped or otherwise designed to provide these advantages such that the support device 100 can still sufficiently support the mobile device.

Furthermore, in some embodiments, as illustrated in FIG. 6, the protuberances 158, 160, and tabs 132 can include respective lower surfaces 166 spaced below a lower side or surface 168 of the support device 100 and/or the composite member 102. The lower surfaces 166 can be configured to be positioned adjacent a primary surface on which the support device 100 is placed, such as a desk, airplane food tray, or any other suitable surface. In some embodiments, the protuberances 150, 160, and tabs 132 can vary in size or height to bring about a particular tilting or other orientation of the mobile device 101 when the support device 100 is placed on a primary surface in the intermediate state and the mobile device 101 is placed on the support device 100.

Furthermore, the protuberances 158, 160, and tabs 132 can be fabricated from a non-slip material such as plastic, rubber, or foam, a combination thereof, or any other suitable material. In some embodiments, all the protuberances and tabs discussed herein can also be formed from a unitary body with the composite member 102, for example the rigid material can be thicker in these regions or the malleable material can be exposed and thicker than the rigid material in these regions.

In some embodiments, the composite member 102 is fabricated from a material that includes a metal-polypropylene-metal laminate. For example, the two rigid layers 106 can be fabricated from a material including a metal, such as aluminum or steel, and the malleable layer 108 can be positioned between the two rigid layers 106 and fabricated from a material including polypropylene. In one embodiment, the composite member 102 can include material sold under the Trademark HYLITE®. In other embodiments the malleable layer 108 can include any other suitable flexible material such as a thermoplastic material, a foam, or silicone. One of ordinary skill in the art, having reviewed the disclosure, will appreciate that the invention can be fabricated from a wide variety of composite materials that differ significantly from the patented HYLITE® composite.

Accordingly, a collapsible support device according to an embodiment of the present disclosure provides a lightweight structure that is easily transformable between different states to facilitate various supporting and/or orienting configurations, and easy transport and storage. Furthermore, since components of the storage device that facilitate transformation of the device, such as hinge elements, can be an integral part of the device, the chance of accidental damage is minimized.

Figure 8:
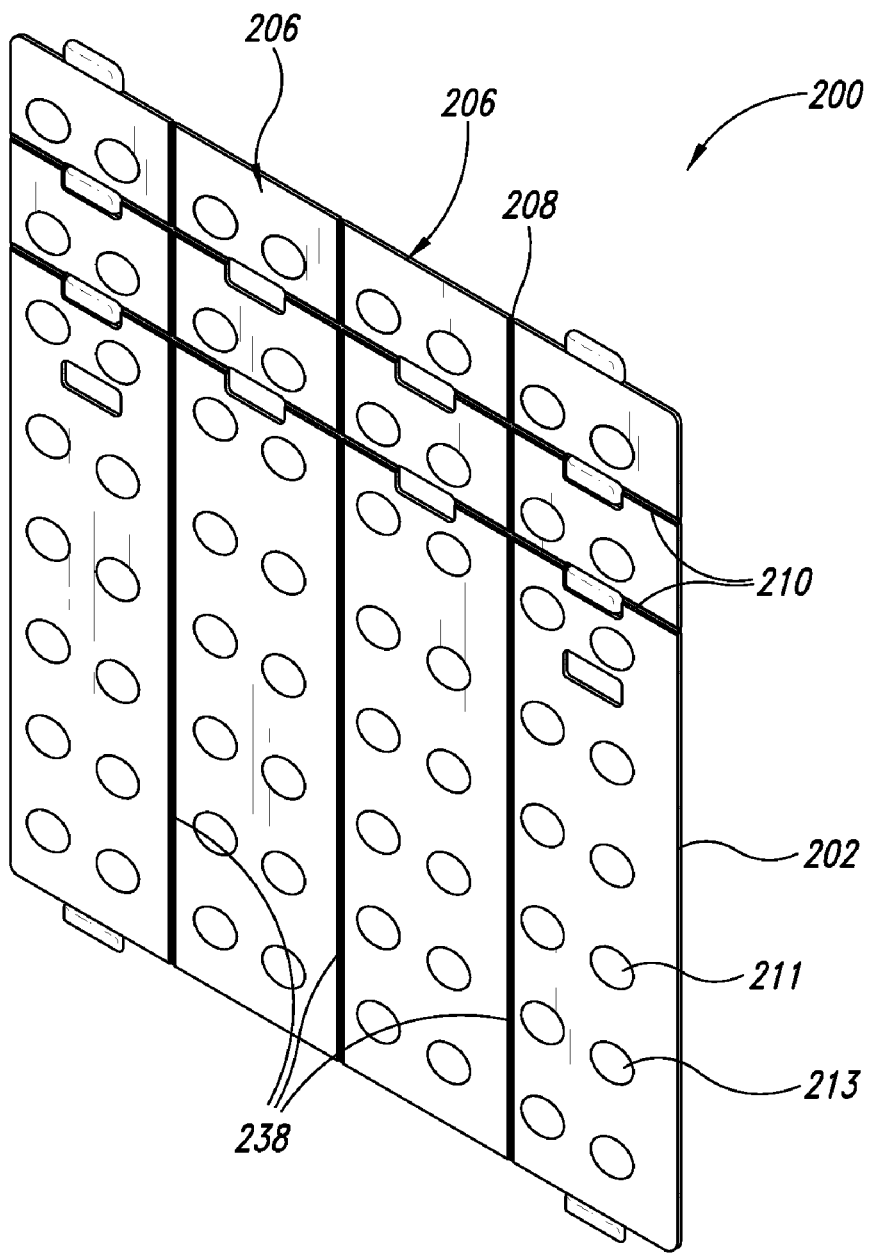
FIG. 8 is an isometric view of a collapsible support device in a first flat or intermediate state, according to another embodiment.

FIG. 8 illustrates a collapsible support device 200 according to another embodiment. The device 200 includes a malleable layer 208 sandwiched between two rigid layers 206, and a plurality of hinge elements 210, 238, to facilitate transforming the device 200 between different states, similar to the other embodiments described herein. In one aspect, the collapsible support device 200 is fabricated from a composite member 202 in which the rigid layers 206 are respectively coupled to the malleable layer 208 via a plurality of coupling openings 211 formed in the rigid layers 206 and a plurality of coupling projections 213 formed on the malleable layer 208.

Figure 9:
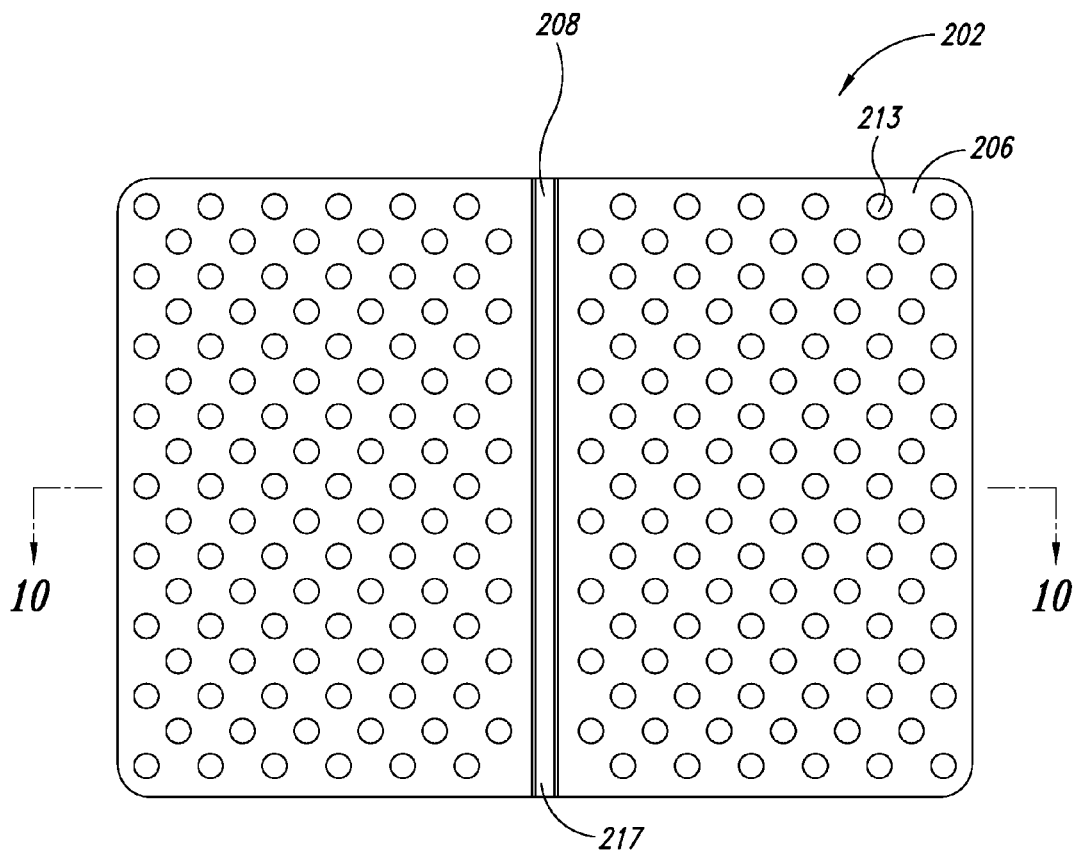
FIG. 9 is a plan view of a piece of composite material according to one embodiment.
Figure 10:
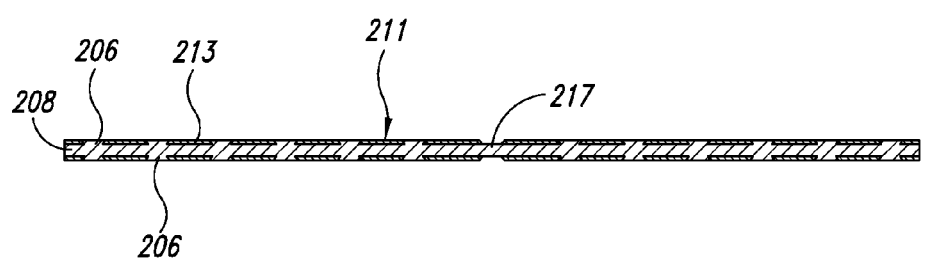
FIG. 10 is a cross-sectional view of the piece of composite material of FIG. 9, viewed along section 10-10, according to one embodiment.
Figure 11:
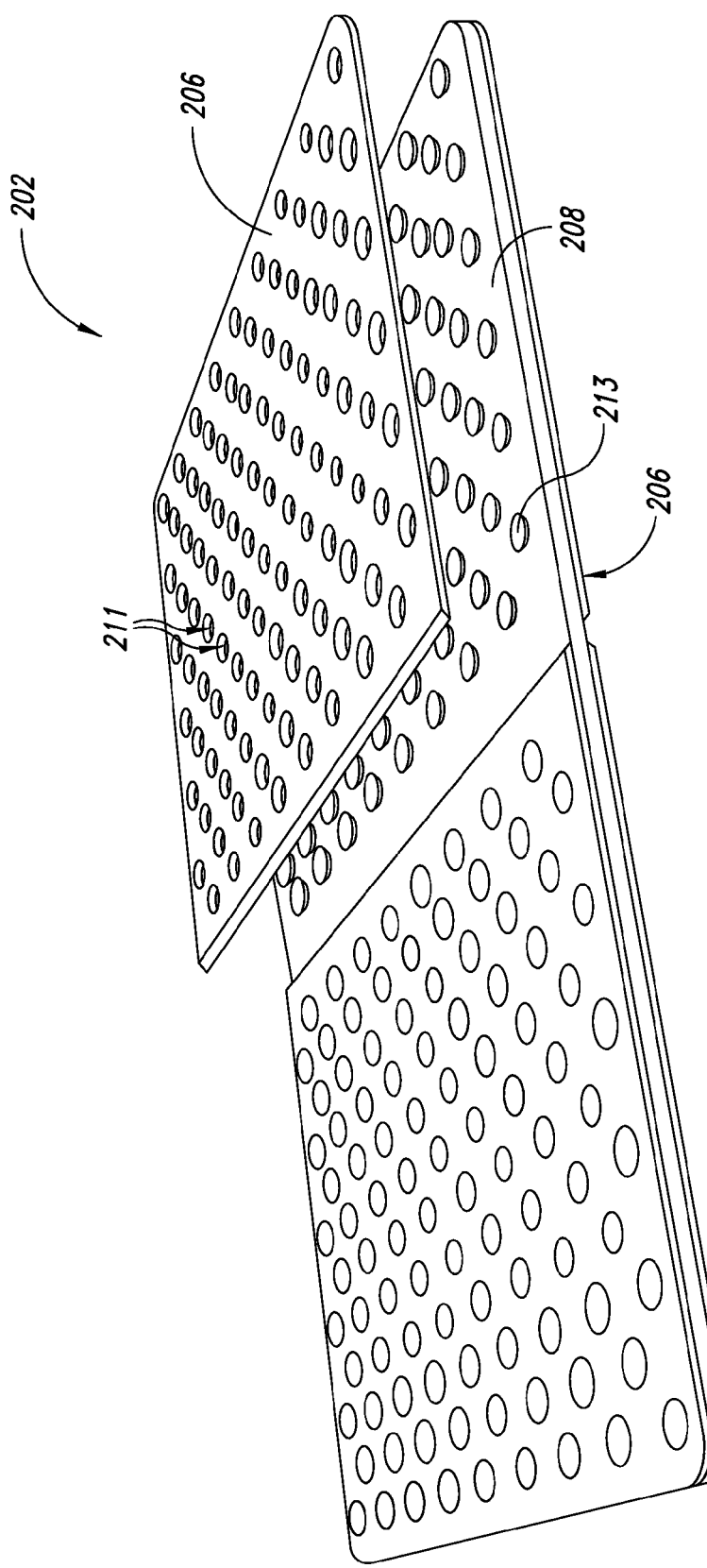
FIG. 11 is a partially exploded isometric view of the composite material, according to one embodiment.

FIGS. 9-11 schematically illustrate a sample portion of the composite member 202 with only one hinge element 217 formed thereon for purposes of describing and illustrating the coupling of the rigid layers 206 and malleable layer 208, according to one embodiment. The composite member 202 can be procured in various sizes and shapes without any hinge elements, as raw material for the support device 200, or for any other suitable purpose. Hinge elements can be formed in desired locations by machining or otherwise substantially removing the rigid layers and maintaining the malleable layer at the desired hinge locations.

As illustrated in FIGS. 10 and 11, the coupling projections 213 can be integrally formed with the malleable layer, for example by injection molding. Furthermore, one or both of the rigid layers 206 can be chamfered at edges of the respective coupling openings 211 to form an inner surface that diverges away from the malleable layer. In such an embodiment, the coupling openings 211 and projections 211, 213 may include complementary frustoconical shapes to securely engage each other, and maintain the rigid layers 206 and malleable layer 208 securely coupled to each other. Although adhesive can be added between the rigid layers 206 and malleable layer 208, the coupling openings and projections 211, 213 obviate the necessity for adhesives, reducing manufacturing steps and costs. In addition, the aforesaid coupling features facilitate selecting material of the rigid layer and/or malleable layer from a large variety of materials because with these features, material choices are not dependent on how they adhere to each other or to adhesives.

For example, in one aspect, the two rigid layers 206 can be fabricated from a material including a metal, such as aluminum, steel, or any other suitable metal. In other embodiments, the rigid layers 206 can include any other material that is substantially rigid, such as hard plastics, or any other suitable material that substantially maintains its shape under a desired loading of a support device according to the present disclosure. In one aspect, the malleable layer 208 can be fabricated from a material including polypropylene, other suitable plastics, or other malleable material.

The shape of the coupling openings and protrusions can vary while the two form substantially complementary shapes to facilitate a secure engagement therebetween.

Some embodiments of a collapsible support device and some embodiments of a composite member for making the support device have been described herein to provide a thorough understanding of the present disclosure. However, various modifications to the configuration of the described embodiments, for example to their shape, hinge element quantity, shape, and location, material selection, and/or other design parameters are contemplated to be within the scope of the present disclosure and the claims that follow.

Figure 12:
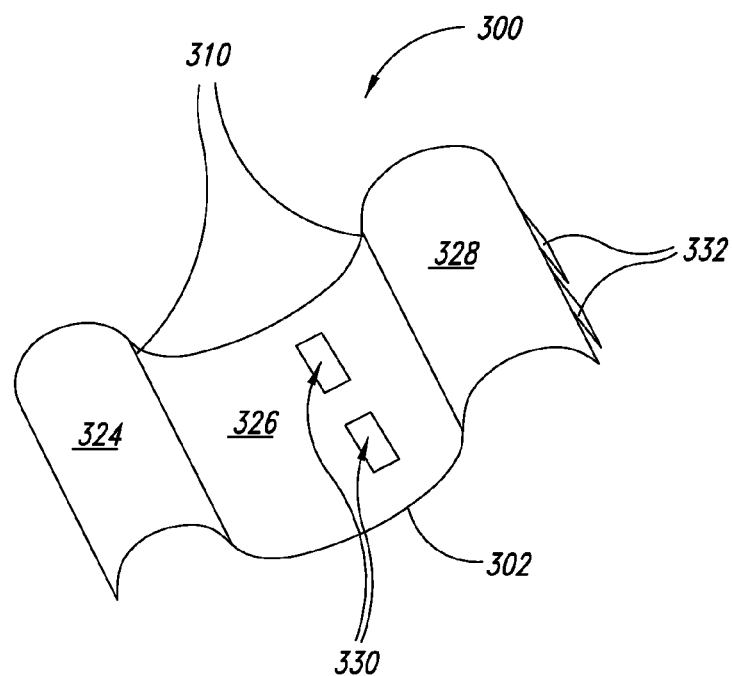
FIG. 12 is a schematic isometric view of a collapsible support device in a first intermediate state, according to yet another embodiment.
Figure 13:
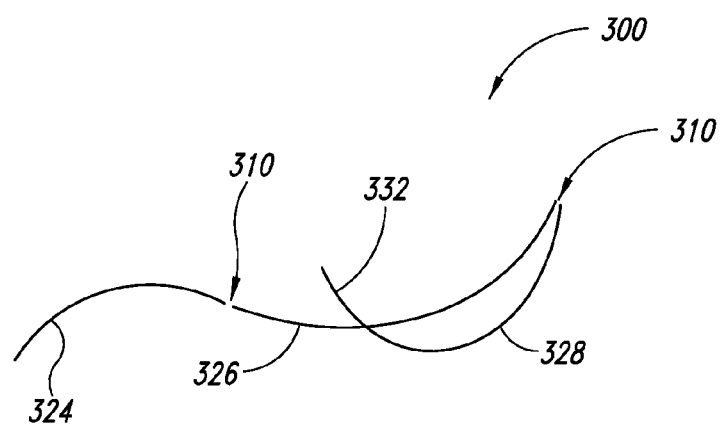
FIG. 13 is a schematic side view of the collapsible support device of FIG. 12 in a second support state, according to one embodiment.

For example, FIGS. 12-13 schematically illustrates a collapsible support device 300 according to yet another embodiment. The collapsible support device 300 includes a composite member 302 having a malleable layer attached to a rigid layer, or sandwiched between two rigid layers. Hinge elements 310 can be incorporated by removing the rigid layer or layers at desired hinge locations. In this embodiment, the composite member 302 can be preformed to include curvatures in the composite member 302. For example, in an embodiment in which two hinge elements 310 divide the composite member 302 into first, second, and third panels 324, 326, 328, the composite member 302 can be preformed to introduce curvatures in these panels.

Figure 14:
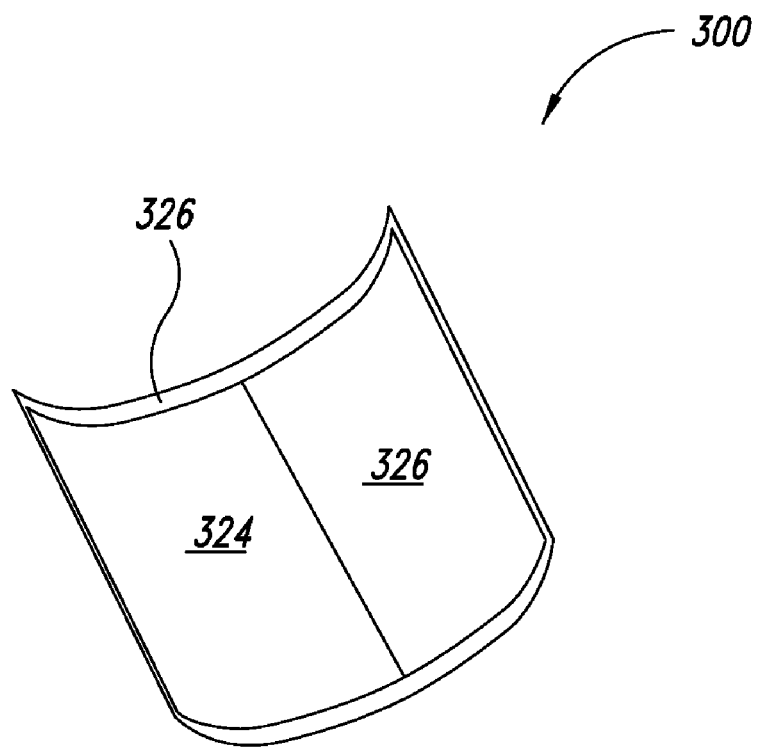
FIG. 14 is a schematic isometric view of the collapsible support device of FIG. 12 in a third collapsed state, according to one embodiment.

In one aspect, the third panel 328 can include tabs 332 and the second panel 326 can include openings 330. The third panel 328 can be pivoted with respect to the second panel 326 about one of the hinge elements 310 for engaging the tabs 332 and the openings 330, and transforming the support device 300 from an intermediate state shown in FIG. 12 to a support state shown in FIG. 13. The hinge elements 310 can facilitate further transformation of the support device 300 into a collapsed state shown in FIG. 14. The curvature of the panels 324, 326, 328 can be designed to facilitate a desired support angle when the device is in the support state, and/or to nest the first and third panels 324, 328, in the second panel 326, as shown in FIG. 14, with the tabs 332 (FIG. 12) tucked under the first panel 324.

The rigid layers can be resilient to allow elastic deformation of the third panel 328, such that it contracts and has a shorter curvature radius when the tabs 332 and openings 330 are engaged in the support state shown in FIG. 13. In such an embodiment, a restitution force in the third panel 328 presses the tabs 332 against an edge of the openings 330.

Figure 16:
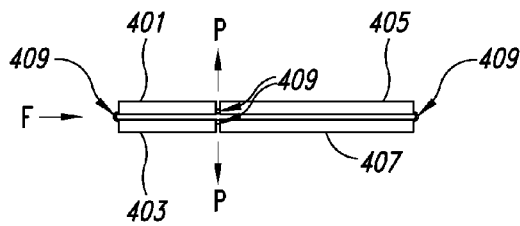
FIG. 16 is an end view of the collapsible support device of FIG. 15.
Figure 15:
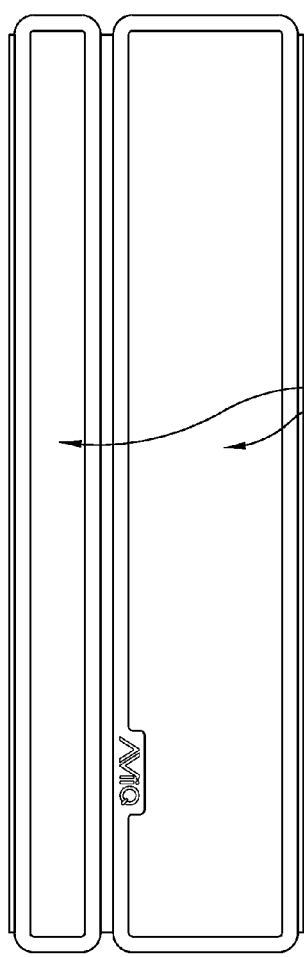
FIG. 15 is a plan view of another embodiment of a collapsible support device, shown in a flat state.

FIGS. 15-18 illustrate yet another embodiment of a collapsible support device 400 including a plurality of substantially rigid members or plates 402, such as four rigid members 401, 403, 405, 407, sequentially coupled to each other via a plurality of malleable hinge elements 409, as shown in FIG. 16. The rigid members 402 can in some embodiments be flexible yet stiffer than the malleable hinge elements 409, such that application of a pressing or pushing force F and/or a pulling force P transforms the collapsible support device 400 from a collapsed state illustrated in FIG. 16 to a stand state illustrated in FIG. 17.

The plates 402 can be arranged and/or configured to facilitate transformation between the collapsed and stand states. For example, in the illustrated embodiment of FIGS. 15-18, the collapsible support device 400 includes a first pair of similarly sized plates 401, 403, adjacent a second pair of similarly sized plates 405, 407, which are longer than the first pair of plates 401, 403.

As at least one of the pushing force F and pulling force P is applied, the two shorter plates 401, 403 can transform from being superposed with respect to each other to being adjacent and collinear or coplanar with respect to each other to form one side of a triangle or prism. Furthermore, the longer plates 405, 407 can transform from being superposed with respect to each other to extending at an angle with respect to each other and diverging away from the malleable hinge 409 therebetween.

Figure 17:
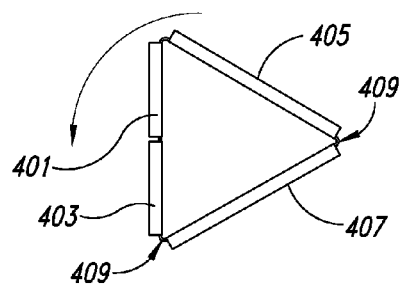
FIG. 17 is an end view of the collapsible support device of FIG. 15, shown in an expanded state.
Figure 18:
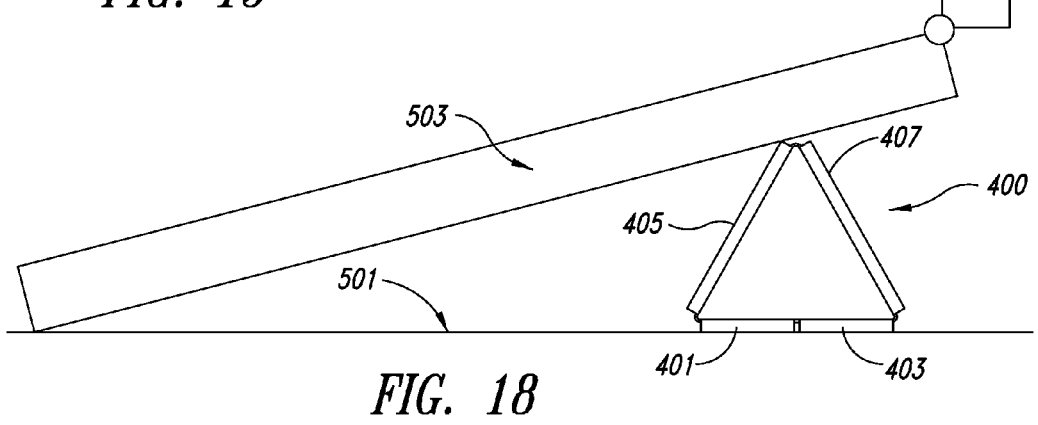
FIG. 18 is an end view of the collapsible support device of FIG. 17, shown supporting a laptop.

The resulting triangular support device can be rotated in the direction of the arrow shown in FIG. 17 so that the two shorter plates 405, 407, are positioned on a primary or supporting surface 501, to support a device 503 such as a laptop or other portable device in an ergonomic orientation, as shown in FIG. 18.

Accordingly, a user can easily store or transport the device 400 in the collapsed state while expediently transforming it into the stand state to ergonomically orient a portable device at any location such as in airports, airplanes, restaurants, office, conference room, or different locations in a home, or any other location.

It is contemplated that the plurality of plates may include a different number of plates while supporting transformation of the device between the collapsed and stand states.

It is contemplated that the collapsible laptop stand 400 can also be fabricated from a malleable layer interposed between two rigid layers similar to the method described with respect to the embodiments above. It is further contemplated that the embodiments above can be fabricated from solid or composite rigid layers locally connected to each other at hinge regions by a malleable layer, rather than the malleable layer spanning the entire area of the rigid layers.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated collapsible support device comprising:
a panel formed from a laminate material including two rigid layers coupled on opposing sides to a malleable layer;
first, second, and third panel portions formed by distinct regions of the composite member and including at least the two rigid layers, the first panel portion including a first coupling feature and a first surface configured to face an object supported by the device, the third panel portion including a second coupling feature configured to be removably engaged to the first coupling feature;
a first hinge element including the malleable layer and excluding both of the rigid layers, the first hinge element hingedly connecting the first panel portion and the second panel portion, the first and second panel portions configured to pivot about the first hinge element, a first protuberance being positioned toward an end of the first panel portion, opposite the first hinge element, and a second protuberance being positioned proximate the first hinge element; and
at least a second hinge element including the malleable layer and excluding both of the rigid layers, the second hinge element hingedly connecting the second panel portion and the third panel portion, pivoting the second and third panels about the first and second hinge elements, respectively, positioning the first coupling feature adjacent the second coupling feature, engagement of the first and second coupling features forming a raised region of the composite member, a third protuberance being positioned proximate the second hinge element, and a fourth protuberance being positioned toward an end of the third panel portion, opposite the second hinge element.

2. The support device of claim 1, further comprising:
a plurality of folding hinge elements each including the malleable layer and excluding both of the rigid layers, the plurality of folding hinge elements intersecting the first and second hinge elements and segregating the first, second, and third panel portions into a plurality of sub-panels, the plurality of folding hinge elements being configured to facilitate selective folding of the plurality of panel portions in alternative directions over corresponding adjacent panel portions to transition the composite member to a collapsed state.

3. The support device of claim 2 wherein the plurality of folding hinge elements are parallel to each other and perpendicular to the first and second hinge elements.

4. The support device of claim 1 wherein the first coupling feature includes at least one opening and the second coupling feature includes at least one tab or protrusion configured to be removably engaged to the opening.

5. The support device of claim 1, wherein:
the third protuberance positioned adjacent the second hinge element is configured to rest on a primary surface when the composite member is in a tilted state.

6. An integrated collapsible support device comprising:
a panel formed from a laminate material including at least one rigid layer coupled to at least one malleable layer, and configured to be selectively transitioned between at least an intermediate state, a tilted state and a collapsed state, in any order;
first, second, and third panel portions formed by distinct regions of the composite member and including at least the rigid layer, the first panel portion including a first coupling feature and a first surface configured to face an object supported by the device, the third panel portion including a second coupling feature configured to be removably engaged to the first coupling feature;

a first hinge element including the malleable layer and substantially excluding the rigid layer, the first hinge element hingedly connecting the first panel portion and the second panel portion, the first and second panel portions configured to pivot about the first hinge element;

at least a second hinge element including the malleable layer and substantially excluding the rigid layer, the second hinge element hingedly connecting the second panel portion and the third panel portion, pivoting the second and third panels about the first and second hinge elements, respectively, positioning the first coupling feature adjacent the second coupling feature, engagement of the first and second coupling features forming a raised region of the composite member to transition the composite member to the tilted state;

a first protuberance positioned toward an end of the first panel portion, opposed to the first hinge element;

a second protuberance positioned proximate the first hinge element;

a third protuberance positioned proximate the second hinge element; and a fourth protuberance positioned toward an end of the third panel portion, opposed to the second hinge element, the first, second, third and fourth protuberances being configured to rest on a primary surface when the composite member is in the intermediate state, the fourth protuberance forming the second coupling feature when the composite member is in the tilted state.

7. The support device of claim 6 wherein at least two of the first, second, third and fourth protuberances have different dimensions.

8. The support device of claim 1 wherein the first engagement feature includes at least one opening and the second engagement feature includes at least one tab, the tab protruding through the corresponding opening and extending beyond the first surface of the first panel portion when the composite member is in a tilted state, to space the mobile device from the first surface and aerate the mobile device, during use.

9. The support device of claim 1 wherein the first and second panel portions each have proximal and distal ends, the first hinge element positioned between the distal end of the first panel portion and the proximal end of the second panel portion, the first panel portion including at least one recess toward the distal end thereof, the second panel portion including a tab toward its proximal end extending into the recess, the tab erecting in response to the second panel portion pivoting with respect to the first panel about the first hinge element.

10. The support device of claim 1 wherein the laminate material includes a metal-polypropylene-metal laminate.

11. The support device of claim 1 wherein laminate material includes two rigid layers fabricated from a material including a metal, the malleable layer being positioned between the two rigid layers and fabricated from a material including polypropylene.

12. The support device of claim 1, further comprising:
at least one protuberance formed on, or coupled to, the first surface and configured to space the mobile device from the supporting surface.

* * * * *